United States Patent [19]

Krings et al.

[11] 4,184,975

[45] Jan. 22, 1980

[54] POURABLE AGGLOMERATED ALUMINOSILICATE BUILDER COMPOSITIONS FOR WASHING AND CLEANSING AGENTS

[75] Inventors: Peter Krings, Krefeld; Josef Huppertz, Dusseldorf-Holthausen; Herbert Reuter, Hilden; Dieter Kühling, Monheim; Milan J. Schwuger, Haan; Heinz Smolka, Langenfeld, all of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 860,611

[22] Filed: Dec. 14, 1977

Related U.S. Application Data

[63] Continuation of Ser. No. 618,343, Oct. 1, 1975, abandoned.

[30] Foreign Application Priority Data

Oct. 3, 1974 [AT] Austria ................................ 7967/74

[51] Int. Cl.$^2$ ........................ C01B 33/28; C11D 3/06; C11D 3/12; C11D 11/00

[52] U.S. Cl. ................................. 252/140; 23/313 R; 23/313 AS; 252/174.25; 252/131; 252/135; 252/175; 252/179; 264/117

[58] Field of Search ....................... 23/313 R, 313 AS; 252/89, 131, 135, 140, 179; 264/117

[56] References Cited

U.S. PATENT DOCUMENTS

| | | | |
|---|---|---|---|
| 3,451,935 | 6/1969 | Roald | 252/135 |
| 3,639,289 | 2/1972 | Heymer | 252/110 |
| 3,929,678 | 12/1975 | Laughlin | 252/526 |
| 3,932,316 | 1/1976 | Sagel | 252/532 |
| 3,939,100 | 2/1976 | Hau | 252/532 |
| 4,071,377 | 1/1978 | Schwuger | 134/29 |
| 4,096,081 | 6/1978 | Phenicie | 252/89 |

FOREIGN PATENT DOCUMENTS

| | | | |
|---|---|---|---|
| 2422655 | 11/1974 | Fed. Rep. of Germany | 252/131 |
| 2433485 | 2/1975 | Fed. Rep. of Germany | 252/131 |
| 1297754 | 11/1972 | United Kingdom | 252/527 |

*Primary Examiner*—Dennis L. Albrecht
*Attorney, Agent, or Firm*—Hammond & Littell

[57] ABSTRACT

A pourable agglomerated aluminosilicate builder composition comprising (A) from 20% to 70% by weight of at least one finely-divided, synthetically-produced, water-insoluble aluminosilicate compound containing at least some combined water and having a calcium binding power of at least 50 mg CaO/gm of anhydrous active substance and the formula on the anhydrous basis $$(M_{2/n}O)_x \cdot Me_2O_3 \cdot (SiO_2)_y$$

where M is a cation of the valence n, exchangeable with calcium, x is a number from 0.7 to 1.5, Me is aluminum or boron, and y is a number from 0.8 to 6, and (B) from 30% to 80% by weight of at least two water-soluble alkali metal salts containing water of crystallization selected from the group consisting of tripolyphosphates, pyrophosphates, orthophosphates, sulfates, carbonates, metasilicates and borates; as well as the process of production of the same.

11 Claims, No Drawings

POURABLE AGGLOMERATED ALUMINOSILICATE BUILDER COMPOSITIONS FOR WASHING AND CLEANSING AGENTS

This is a continuation of Ser. No. 618,343, filed Oct. 1, 1975, and now abandoned.

THE PRIOR ART

Copending, commonly-assigned U.S. patent application Ser. No. 458,303, filed Apr. 5, 1974, now abandoned in favor of continuation application Ser. No. 813,436, filed July 7, 1977, discloses processes for the production of solid, pourable, washing and cleansing agents containing surface-active compounds, builders, and calcium binding compounds, said calcium binding compounds consisting of at least one finely-dispersed, synthetically-produced, water-insoluble silicate compound containing at least some combined water and having a calcium binding power of at least 50 mg CaO/gm of anhydrous active substance and the formula of the anhydrous basis $$(M_{2/n}O)_x.Me_2O_3.(SiO_2)_y$$

where M is a cation of the valence n, exchangeable with calcium, x is a number of from 0.7 to 1.5, Me is a member selected from the group consisting of aluminum and boron, and y is a number from 0.8 to 6, preferably from 1.3 to 4. In these processes, the steps of mixing said silicate compound, while still moist from its production, with at least part of the remaining components of the washing and cleaning agent and converting the entire mixture of components into a pourable product, is described. According to a variation of the process, the pourable washing and cleaning agents are obtained by binding the water adhering to the moist silicates by the dry constituents of the washing and cleaning agents as water of crystallization and/or hydration.

The water-insoluble, finely-divided silicates defined above may be x-ray amorphous or crystalline. The cation exchangeable with calcium is preferably sodium, but it may also be lithium, potassium, ammonium, or magnesium, as well as the cation of water-soluble organic bases, for example primary, secondary or tertiary alkylamines or alkylolamines with not more than 2 carbon atoms per alkyl group or not more than 3 carbon atoms per alkylol group. Of the silicates of the above-defined composition, aluminosilicates, and especially sodium aluminosilicates are preferably used, the calcium binding power of which may reach values of 200 mg CaO/gm AS and is preferably in the range of from 100 to 200 mg CaO/gm of AS. Therefore, for simplicity's sake these silicates are denoted below as "aluminosilicates". All details given for their preparation and use obviously apply also to all the above-defined compounds.

The aluminosilicates can be prepared synthetically in a simple way, for example by the reaction of water-soluble silicates with water-soluble aluminates in the presence of water. For this purpose, aqueous solutions of the starting materials may be mixed or a component present in the solid state may be reacted with the other component present as an aqueous solution. The desired aluminosilicates are also obtained by admixing both components present in the solid state in the presence of water, preferably with comminution of the mixture. Aluminosilicates can also be prepared from $Al(OH)_3$, $Al_2O_3$ or $SiO_2$ by reacting with alkali metal silicate or aluminate solutions respectively.

The processes described in the aforementioned patent application enable the aluminosilicates to be converted into solid pourable washing and cleaning agents without expensive isolation and previous drying. According to these processes, the freshly precipitated, moist aluminosilicates, either x-ray amorphous or converted into an x-ray crystalline state, are further processed then and there into washing and cleaning compositions.

However, transport and storage problems result if the moist aluminosilicates are not produced at the point of further processing and must be moved, loaded and transported in larger quantities. But even if the further processing is done at the same place, the transport devices which are conventionally intended for either liquid or pourable products, cannot be employed with the moist aluminosilicates without difficulty.

OBJECTS OF THE INVENTION

An object of the present invention is to improve the transportability and storeability of the moist aluminosilicates while avoiding an expensive drying process, and to make the aluminosilicates available in a form which enables their simple further use in washing and cleaning compositions.

Another object of the present invention is the development of a pourable agglomerated aluminosilicate builder composition consisting essentially of (A) from 20% to 70% by weight of at least one finely-divided synthetically-produced, water-insoluble aluminosilicate compound containing at least some combined water and having a calcium binding power of at least 50 mg CaO/gm of anhydrous active substance and the formula on the anhydrous basis $$(M_{2/n}O)_x.Me_2O_3.(SiO_2)_y$$

where M is a cation of the valence n, exchangeable with calcium, x is a number of from 0.7 to 1.5, Me is a member selected from the group consisting of aluminum and boron, and y is a number from 0.8 to 6, and (B) from 30% to 80% by weight of at least two water-soluble alkali metal compounds containing water of crystallization selected from the group consisting of tripolyphosphates, pyrophosphates, orthophosphates, sulfates, carbonates metasilicates and borates.

A further object is the development of a process for the production of the above pourable, agglomerated aluminosilicate builder compositions consisting essentially of mixing said moist, finely-divided, water-insoluble aluminosilicate having a water content of from 30% to 60% by weight, with at least two substantially-anhydrous finely-powdered alkali metal salts of compounds capable of binding water as water of crystallization selected from the group consisting of tripolyphates, pyrophosphates, orthophosphates, sulfates, carbonates, metasilicates and borates, and recovering said agglomerated aluminosilicate builder composition.

These and other objects of the invention will become more apparent as the description thereof proceeds.

DESCRIPTION OF THE INVENTION

The above objects have been achieved in accordance with the invention by the development of a pourable, agglomerated aluminosilicate builder composition containing at least some bound water consisting of (A) from 20% to 70% by weight of the above defined aluminosilicates which are capable of binding calcium ions, and (B) from 30% to 80% by weight of at least two water-soluble alkali metal salts containing water of crystallization selected from tripolyphosphates, pyrophosphates, orthophosphates, sulfates, carbonates, metasilicates and borates. The sodium salts are especially preferred.

More particularly, the invention comprises a pourable agglomerated aluminosilicate builder composition consisting essentially of (A) from 20% to 70% by weight at least one finely-divided synthetically-produced, water-insoluble aluminosilicate compound containing at least some combined water and having a calcium binding power of at least 50 mg CaO/gm of anhydrous active substance and the formula on the anhydrous basis $$(M_{2/n}O)_x \cdot Me_2O_3 \cdot (SiO_2)_y$$

where M is a cation of the valence n, exchangeable with calcium, x is a number from 0.7 to 1.5, Me is a member selected from the group consisting of aluminum and boron, and y is a number from 0.8 to 6, and (B) from 30% to 80% by weight of at least two water-soluble alkali metal compounds containing water of crystallization selected from the group consisting of tripolyphosphates, pyrophosphates, orthophosphates, sulfates, carbonates, metasilicates and borates; as well as the process for the production of the above pourable, agglomerated aluminosilicate builder composition consisting essentially of mixing said moist, finely-divided, water-insoluble aluminosilicate having a water content of from 30% to 60% by weight, with at least two substantially-anhydrous finely-powdered alkali metal salts of compounds capable of binding water as water of crystallization selected from the group consiting of tripolyphates, pyrophosphates, orthophosphates, sulfates, carbonates, metasilicates and borates, and recovering said agglomerated aluminosilicate builder composition.

The amount of the water bound by surface forces or as water of crystallization in the agglomerate according to the invention lies especially in the range of from 8% to 40% by weight. The average particle size of the above-defined agglomerates preferably is below 1.0 mm and at least 80% below 0.8 mm.

In the process for the preparation of the above-defined agglomerated, aluminosilicate builder composition, from 25 to 75 parts by weight of the finely-divided moist aluminosilicates according to the above definition, which have a water content of from 30% to 60%, especially 35% to 55% by weight, are admixed with 25 to 75 parts by weight of at least two finely powdered, substantially anhydrous alkali metal, especially sodium, salts of compounds capable of binding moisture as water of crystallization or hydration selected from the tripolyphosphates, pyrophosphates, orthophosphates, sulfates, carbonates, metasilicates and borates.

Agglomerates with specially good powder properties are obtained when each individual component of the at least binary salt mixture, based on the anhydrous form of the salts, comprises at least 10% by weight, preferably at least 20% by weight of the total salt mixture.

Finely powdered salts capable of binding water are preferably calcined salts with a bulk density of 300 to 1000 gm per liter. Particularly suitable salts are sodium tripolyphosphate, sodium pyrophosphate, sodium sulfate, sodium carbonate and sodium metasilicate.

The moist aluminosilicates utilizable according to the invention are obtained after the separation of the mother liquor or the wash water by the usual separation devices, for example by filter presses, centrifugal separators, thrust filter centrifuges, band or rotary filters, as a friable mass with a water content of 30% to 60% by weight. This amount of water is composed of the superficially adhering free water and the water adsorptively bound in the hollow spaces of the aluminosilicates. The amount of this bound water in an aluminosilicate powder with an outwardly dry feel amounts to 15% to 30% by weight at room temperature depending on the moisture of the air, as well as the type and the particle size of the aluminosilicates.

When the moist aluminosilicates are dried by the usual methods, for example in a vacuum chamber or in a heated fluidized bed, at 50° to 200° C., the outwardly adhering water causing the moisture feel of the aluminosilicate and a part of the bound water can be removed. Thus, by drying a moist aluminosilicate powder, for example for 3 hours in a drying chamber at 80° C. and 100 Torr, a product is obtained which still contains 10% to 20% by weight of bound water. This residual bound water can only be completely driven off by heating the aluminosilicate for one hour at 800° C. The amounts of water obtained therefore relate to aluminosilicates which have been obtained by heating for an hour a previously dried sample at 800° C. until free from water. Such anhydrous aluminosilicates are referred to as active substance (AS).

By admixing with the combinations of salts according to the invention it was surprisingly found that the moisture of the aluminosilicates can be bound as water of crystallization or water of hydration and there is thus obtained an outwardly dry feeling, readily pourable agglomerate, which has good storage and transporting properties.

The process according to the invention can be effected in the usual mixing apparatus, as for example in pan mixers, in rotating drums, turbine mixers and fluidized bed mixers.

The amount of bound water contained in the agglomerates according to the invention can be further reduced by passing a dry stream of air, over the mixing material or through a fluidized bed with the utilization and conduction of the heat of hydration. The consumption of energy required for this, however, is small compared with a conventional hot drying process, which is avoided by the process according to the invention. In special cases, for example when an increase of the volume-time yield is desired, further drying can also be effected by using a hot stream of air, for example with air at about 100° C. through a fluidized bed. Here also the consumption of energy is distinctly less than in the case of hot drying of a pumpable aqueous slurry.

The agglomerates according to the invention are readily wetted by water and readily disperseable. Owing to their high binding capacity for calcium ions and their good cleansing action, they are suitable as builder components for washing and cleansing agent compositions of all kinds. The agglomerates of builder substances, however, are also, of themselves useful as cleansing agents and washing assistants, especially when they contain alkaline reacting salts, as for example sodium carbonate or sodium metasilicate. They are used in this form for cleansing materials with a smooth surface, as for example articles made ceramics, glass, metal, wood or plastics. In addition they are suitable as washing assistants in washing textiles, for example as soaking or softening agents or as additives to washing agents in industrial laundries or in the textile industry.

The moist aluminosilicates used for the production of the agglomerates according to the invention preferably contain no particles greater in size than 30μ and consist of at least 80% by weight of particles of size 10 to 0.01μ, especially 8 to 0.1μ. Although hardly any difference exists between the amorphous and the crystalline forms with respect to their calcium binding capacity, the crystalline aluminosilicates are preferably used for the purposes of the invention.

The preferred calcium binding power of the aluminosilicates lying in the range from 100 to 200 mg CaO/gm AS is found above all with compounds of the composition:

$$0.7-1.1Na_2O.Al_2O_3.\ 1.3-3.3SiO_2.$$

This combined formula includes two types of aluminosilicates, which, provided they are crystalline, differ in their crystal structure and their x-ray diffraction diagram. These two types have the composition:

(a) $0.7-1.1Na_2O.\ Al_2O_3.\ 1.3-2.4SiO_2$ (b) $0.7-1.1Na_2O.Al_2O_3.>2.4-3.3SiO_2$

The crystalline aluminosilicates of the types (a) and (b) show the following interference lines in the x-ray diffraction diagram:

| d-values, recorded with Cu-$K_\alpha$-radiation in A | |
|---|---|
| Type (a) | Type (b) |
| — | 14.4 |
| 12.4 | — |
| — | 8.8 |
| 8.6 | — |
| 7.0 | — |
| — | 4.4 (+) |
| 4.1 (+) | — |
| — | 3.8 (+) |
| 3.68 (+) | — |
| 3.38 (+) | — |
| 3.26 (+) | — |
| 2.96 (+) | — |
| — | 2.88 (+) |
| — | 2.79 (+) |
| 2.73 (+) | — |
| — | 2.66 (+) |
| 2.60 (+) | — |

It is quite possible that all these interference lines do not occur in the x-ray diffraction diagram, especially if the aluminosilicates are not types of a completely pure structure. Therefore the most important d-values for the characterization of these types have been characterized with a "(+)".

The preparation of the aluminosilicates utilizable for the invention is described in the experimental part.

The agglomerates according to the invention are utilized in the preparation of washing and cleansing agent compositions. They are mixed with further customary constituents of washing and cleansing agent compositions and possibly further processed, in which case the procedure may be according to the following variants:

1. The agglomerate is admixed with a dry pourable powder consisting of the other constituents of the preparation in known way, while the particle size of the powder from the other constituents preferably lies in the range of the particle size of the agglomerate according to the invention.
2. The agglomerate is introduced into an aqueous solution or dispersion of the remaining constituents of the preparation and the aqueous slurry of the preparation thus formed is converted in known way by hot drying into a dry pourable product, with which possible heat-sensitive additives, such as for example perborate, are admixed.
3. The agglomerate is introduced into an aqueous solution or dispersion of the remaining constituents of the preparation and a liquid to paste-like preparation is thus formed.

This invention will now be further described by means of the following Examples which are not limitative.

EXAMPLES

First, the preparation of the aluminosilicates to be employed according to the invention is described. Other moist aluminosilicates are described in the above mentioned application Serial No. 458,303, as well as the method of determining the calcium binding capacity.

The calcium binding power of the aluminosilicates was determined as follows: 1 liter of an aqueous solution, containing 0.594 gm of $CaCl_2$ (=300 mg CaO/liter=30° dH) and adjusted to a pH value of 10 with dilute NaOH, was admixed with 1 gm of aluminosilicate (AS basis). Then the suspension was stirred vigorously for 15 minutes at a temperature of 22° C. (±2° C.). After the aluminosilicate had been filtered off, the residual hardness x of the filtrate was determined. From this, the calcium binding power is calculated in mg CaO/gm As according to the formula: $(30-x)\cdot 10$. For short hand purposes the above procedure is hereinafter referred to by the Calcium Binding Power Test Method.

SYNTHESIS OF THE CRYSTALLINE ALUMINOSILICATES

A sodium aluminate solution was placed in a stirred vessel and treated with a sodium silicate solution with vigorous stirring. The quantity, composition and concentration of these solutions are given in the description of the individual aluminosilicate types. The mixture was stirred for 10 minutes with a high-speed stirrer (for example a stirrer with a dispersing disc, 3000 r.p.m.). The suspension of the precipitation products thereby formed was then transferred to a crystallization vessel and maintained for some time at elevated temperature (70° to 100° C.) for the purpose of crystallization. The formation of large crystals was prevented by stirring the suspension (250 r.p.m.). The liquid was separated from the crystalline mass in a screen or filter centrifuge. In some cases it was preferably further washed with deionized water until the washings had a pH value of about 10. The residual water content of the product was between 30% and 60%, depending on the number of revolutions of the centrifuge and the time of running. To determine the residual water content of the aluminosilicates, samples were converted into a completely water-free product by drying at 800° C.

All percentage data are percents by weight.

ALUMINOSILICATE IM

For the precipitation, 2.985 kg of an aluminate solution of the composition 17.7% $Na_2O$, 15.8% $Al_2O_3$, 66.5% $H_2O$ were placed in a 20-liter vessel, mixed with a solution of 0.150 kg of caustic soda in 9.420 kg of water and to this were added 2.445 kg of a 25.8% solution of a sodium silicate of the composition 1 $Na_2O$.6-$SiO_2$, freshly prepared from commercial waterglass and readily alkali-soluble silicic acid. For the crystallization the suspension was maintained at 90° C. for 6 hours. Then the product was separated in a filter centrifuge. The water content of the product was 41.5%. The composition of a sample dried at 800° C. was: 0.9$Na_2O$.1$Al_2O_3$.2.04$SiO_2$. Calcium binding capacity (a water-free sample): 170 mg CaO/gm. The product "Aluminosilicate Im" corresponds to the above-indicated structural type (a).

ALUMINOSILICATE IIM

For the precipitation, 2.115 kg of an aluminate solution of the composition 17.7% $Na_2O$, 15.8% $Al_2O_3$, 66.5% $H_2O$ were placed in a 20 liter vessel, mixed with a solution of 0.585 kg of caustic soda in 9.615 kg of water and reacted with 2.685 kg of a 25.8% solution of a sodium silicate of the composition 1 $Na_2O$.6$SiO_2$ (prepared as given under Im). For the crystallization, the suspension was maintained at 90° C. for 12 hours. Then the product was separated in a filter centrifuge. The water content of the product=38.8%. Composition of a sample dried at 800° C.: 0.8$Na_2O$.1$Al_2O_3$.2.65$SiO_2$. Calcium binding capacity (of a water-free sample): 145 mg CaO/gm. The product "Aluminosilicate IIm" corresponds to the above-indicated structural type (b).

ALUMINOSILICATE RI

This aluminosilicate belongs to the structural type a; the cubic crystalline grains, however, have strongly rounded off corners and edges. For the synthesis of the product RI, 7.63 kg of an aluminate solution of the composition 13.2% $Na_2O$, 8.0% $Al_2O_3$, 78.8% $H_2O$ were placed in a stirred vessel and reacted with 2.37 kg of a sodium silicate solution of the composition 8.0% $Na_2O$, 26.9% $SiO_2$, 65.1% $H_2O$. This charge corresponds to the molar ratio 3.24$Na_2O$, 1.0$Al_2O_3$, 1.78$SiO_2$, 70.3$H_2O$. This suspension of the precipitation product was maintained for 6 hours at 90° C. for the crystallization. Then the product was separated in a filter press. Water content of the product=46.2%. Composition of a sample dried at 800° C.: 0.99$Na_2O$.1.00$Al_2O_3$.1.83$SiO_2$. Calcium binding capacity of a water free sample: 172 mg CaO/gm. Average diameter of particles (for the range 0–30μ): 5.4μ. Maximum range of the particle size distribution curve was situated at 3μ.

For the preparation of the agglomerates according to the invention a mixer was used, consisting of a horizontal cylinder with a cooling jacket and rotating paddle arms (apparatus of the firm Lödige, Paderborn, Germany). The mixing process was carried out so that the calcined inorganic salts were first introduced and then the moist aluminosilicate powder was added. The mixing time was 5 to 15 minutes. The agglomerates thus obtained could then be immediately stored. When the still warm agglomerates were exposed in a fluidized bed to a dry, possibly hot stream of air, the powder properties could be further improved.

The following inorganic calcined salts were used:

| | Bulk weight g/l |
|---|---|
| TPP = sodium tripolyphosphate | 450 |
| PYP = sodium pyrophosphate | 360 |
| SUL = sodium sulfate | 460 |
| CAR = sodium carbonate | 610 |
| MES = sodium metasilicate | 920 |

The following Examples A 1 to A 10 describe the compositions according to the invention of agglomerates using the above described aluminosilicate types Im, IIm and RI and the calcined inorganic salts. These preparations were found to be readily pourable even after relatively long storage.

| Example | Aluminosilicate Im (41.5% $H_2O$) | TPP | SUL | PMP | CAR | MES |
|---|---|---|---|---|---|---|
| A 1 | 70 | 4 | 26 | — | — | — |
| A 2 | 70 | 10 | 20 | — | — | — |
| A 3 | 70 | 16 | 14 | — | — | — |
| A 4 | 60 | 20 | 10 | — | 10 | — |
| A 5 | 60 | 20 | 10 | — | — | 10 |
| | Aluminosilicate IIm (38.8% $H_2O$) | | | | | |
| A 6 | 50 | 10 | 10 | — | — | 30 |
| A 7 | 60 | — | 20 | 10 | 10 | — |
| A 8 | 50 | 5 | 20 | — | 10 | 15 |
| | Aluminosilicate RI (46.2% $H_2O$) | | | | | |
| A 9 | 60 | 10 | 20 | 10 | — | — |
| A 10 | 60 | — | 10 | — | 10 | 20 |

The following Examples M 1 to M 5 illustrate the use of the agglomerates according to the invention as builder components for phosphate-poor washing and cleansing agent compositions.

EXAMPLE M 1

This Example describes the use of the agglomerate as builder component of a washing agent, which was obtained by mixing 60 parts by weight of the preparation A 3 with 40 parts by weight of a powder prepared by hot spraying of the following composition:

| | |
|---|---|
| Sodium dodecylbenzenesulfonate | 20.5% |
| Soap ($C_{16}$ to $C_{22}$) | 9.0% |
| Waterglass (1:3.3) | 12.0% |
| Sodium triphosphate | 26.0% |
| Sodium sulfate | 18.5% |
| Sodium ethylenediaminetetraacetate | 1.5% |
| Carboxymethylcellulose-sodium salt | 4.0% |
| Remainder (water, optical brightener, perfume) | 8.5% |

EXAMPLE M 2

This Example describes the use of the agglomerate for the preparation of a hot-dried washing agent. 75 parts by weight of the preparation A 9 were introduced in a mixture of 9.0 parts by weight sodium dodecylbenzenesulfonate
3.0 parts by weight tallo fatty alcohol polyglycolether with 14 mols of ethylene oxide
1.5 parts by weight tallow fatty alcohol polyglycolether with 5 mols of ethylene oxide
3.5 parts by weight soap ($C_{18}$ to $C_{22}$)
0.2 parts by weight sodium ethylenediaminetetraacetate
4.0 parts by weight waterglass (1:3.3)
1.5 parts by weight carboxymethylcellulose-sodium salt, -continued

| | |
|---|---|
| | and |
| 105.0 parts by weight water | |

and the resulting suspension was converted by hot spraying into a pulverulent product. 3 parts by weight of this washing agent powder was mixed with 1 part by weight of sodium perborate.

EXAMPLE M 3

For the preparation of a hot-dried washing agent, the procedure was as in Example M 2, but the surface-active component of the formulation M 2 (13.5 parts by weight without the foam-inhibiting soap) was replaced by 9 parts by weight of tallow fatty alcohol polyglycolether with 14 mols of ethylene oxide and 4.5 parts by weight of tallow fatty alcohol polyglycolether with 5 mols of ethylene oxide.

EXAMPLE M 4

A dish-washing agent for dish-washing machines was prepared by admixture of the following components:

95 parts by weight of the agglomerate A 6
3 parts by weight of sodium dichloroisocyanurate
2 parts by weight of ethoxylated polypropyleneglycolether Pluronic L 61

EXAMPLE M 5

A liquid to paste-like alkaline cleaning agent, for example for fat-soiled metal surfaces, was prepared by admixture of the following components:

30 parts by weight of the agglomerate A 10
1.0 parts by weight of sodium dodecylbenzenesulfonates
3.0 parts by weight of oleyl/cetyl alcohol polyglycolether with 10 mols of ethylene oxide
3.0 parts by weight of potassium xylenesulfonate
5.0 parts by weight of propyleneglycol
58.0 parts by weight of water (weighed).

The preceeding specific embodiments are illustrative of the practice of the invention. It is to be understood, however, that the expedients known to those skilled in the art, or disclosed herein may be employed without departing from the spirit of the invention or the scope of the appended claims.

We claim:

1. A process for the production of a pourable agglomerated aluminosilicate builder composition which consists essentially of intimately mixing from 50 to 75 parts by weight of at least one moist, finely-divided synthetically-produced, water-insoluble aluminosilicate compound having a water content of from 30% to 60% by weight, a calcium binding power of from 100 to 200 mg CaO/gm of anhydrous active substance when measured at 22° C. by the Calcium Binding Power Test Method set out in the specification, a particle size of from 0.1 to 30μ, and the formula on the anhydrous basis $$(M_2O)_x.Me_2O_3.(SiO_2)_y$$

where M is a cation selected from the group consisting of sodium and potassium, x is a number from 0.7 to 1.1, Me is a member selected from the group consisting of aluminum and boron, and y is a number from 1.3 to 3.3, with from 25 to 50 parts by weight of at least two substantially-anhydrous, finely-powdered alkali metal salts capable of binding water as water of crystallization or hydration selected from the group consisting of tripolyphosphates, pyrophosphates, sulfates, carbonates, and metasilicates, at least one of said salts being alkali metal tripolyphosphate, wherein each of said at least two water-soluble alkali metal salts is present in an amount, on the anhydrous basis, of 10% by weight of the weight of said water-soluble alkali metal salts, and recovering said agglomerated aluminosilicate builder composition.

2. The process of claim 1 wherein said water content of said moist aluminosilicate is from 35% to 50% by weight.

3. The process of claim 1 wherein said alkali metal salts are calcined sodium salts with a bulk density of from 300 to 1000 gm per liter.

4. The process of claim 1 wherein a dry stream of air is brought into contact with the ingredients during and subsequent to said intimate mixing step.

5. The process of claim 1 wherein said moist aluminosilicate compound has an average particle size of less than 30μ and at least 80% of said particles have an average particle size of from 10 to 0.01μ.

6. The process of claim 5 wherein 80% of said particles have an average particle size of from 8 to 0.1μ.

7. The process of claim 1 wherein said aluminosilicate compound has the formula $$0.7\text{-}1.1Na_2O.Al_2O_3.1.3\text{-}3.3SiO_2.$$

8. The agglomerated aluminosilicate builder composition produced by the process of claim 1.

9. The agglomerated aluminosilicate builder composition of claim 8 wherein M is sodium and the alkali metal salt is sodium.

10. The agglomerated aluminosilicate builder composition produced by the process of claim 7.

11. The process of claim 6 wherein each of said alkali metal salts in said mixture is present in an amount, on the anhydrous basis, of at least 20% by weight of the mixture of salts.

* * * * *